US011774747B2

(12) United States Patent
Charton et al.

(10) Patent No.: US 11,774,747 B2
(45) Date of Patent: Oct. 3, 2023

(54) ADAPTIVE OPTICAL DEVICE OF SIMPLIFIED CONSTRUCTION AND ASSOCIATED MANUFACTURING METHOD

(71) Applicant: ALPAO, Montbonnot-Saint-Martin (FR)

(72) Inventors: Julien Gérard Charton, Lumbin (FR); Marie Emilie Laslandes, Gieres (FR)

(73) Assignee: ALPAO, Montbonnot-Saint-Martin (FR)

( * ) Notice: Subject to any disclaimer, the term of this patent is extended or adjusted under 35 U.S.C. 154(b) by 159 days.

(21) Appl. No.: 17/607,528

(22) PCT Filed: Aug. 26, 2020

(86) PCT No.: PCT/HR2020/000227
§ 371 (c)(1),
(2) Date: Oct. 29, 2021

(87) PCT Pub. No.: WO2021/038140
PCT Pub. Date: Mar. 4, 2021

(65) Prior Publication Data
US 2022/0214538 A1 Jul. 7, 2022

(30) Foreign Application Priority Data
Aug. 30, 2019 (FR) ...................................... 1909594

(51) Int. Cl.
*G02B 26/08* (2006.01)
(52) U.S. Cl.
CPC ..... *G02B 26/0875* (2013.01); *G02B 26/0825* (2013.01)

(58) Field of Classification Search
CPC .......................... G02B 26/0875; G02B 26/0825
USPC ........ 359/198.1, 212.1, 221.2, 290, 298, 822
See application file for complete search history.

(56) References Cited

U.S. PATENT DOCUMENTS 6,912,078 B2 * 6/2005 Kudrle ............... G02B 26/0841
359/290

FOREIGN PATENT DOCUMENTS

| EP | 3203299 A1 | 8/2017 |
| WO | 2004057407 A1 | 7/2004 |
| WO | 2010058204 A1 | 5/2010 |

* cited by examiner

*Primary Examiner* — William Choi
(74) *Attorney, Agent, or Firm* — Nath, Goldberg & Meyer; Joshua B. Goldberg (57) ABSTRACT

The invention concerns an adaptive optical device (1) comprising a deformable plate (2) intended to deform an incident wavefront by refraction and/or reflection, characterised in that it comprises: —tabs (5) fixedly attached to the plate (2), —a frame (21) fixed relative to the plate (2), each tab (5) comprising a moving portion (22) connected to at least one respective peripheral actuator (7) in order that the latter can locally deform the tab (5) in order that the tab transmits a deformation force to the deformable plate (2), each tab (5) further comprising a respective fixed portion (23) fixedly attached to the frame (21) in order to be immobilised relative to the frame. The invention is particularly suitable for the introduction or controlled correction of an optical aberration in an incident wavefront.

20 Claims, 6 Drawing Sheets

ADAPTIVE OPTICAL DEVICE OF SIMPLIFIED CONSTRUCTION AND ASSOCIATED MANUFACTURING METHOD

This is a National Phase Application filed under 35 U.S.C. 371 as a national stage of PCT/FR2020/000227, filed Aug. 26, 2020, an application claiming the benefit of French Application No. 1909594, filed Aug. 30, 2019, the content of each of which is hereby incorporated by reference in its entirety.

TECHNICAL FIELD

The present invention concerns the general technical field of adaptive optics, for applications as various as astronomy, medicine, in particular ophthalmology, the use of lasers, microscopy, microelectronics, etc.

More particularly, the present invention relates to an adaptive optical device including a deformable plate intended to deform an incident wavefront by refraction and/or reflection.

The present invention also concerns a method for manufacturing such an adaptive optical device.

PRIOR ART

It is known to use active, that is to say adaptive, optical device, for example deformable mirrors allowing generating or correcting, in a controlled manner, optical aberrations, such as astigmatism, in an incident wavefront. In practice, such a deformable mirror could change configuration to modify the shape of a wavefront as desired, thanks to deformations imparted to the surface of such a mirror on which the incident wavefront is reflected. The incident wavefront that arrives on the surface of the mirror is deformed into a reflected wavefront wherein the initial optical aberration (that of the incident wavefront) has been generated or corrected by the deformable mirror. In particular, there are known adaptive mirrors in the astronomy field, which comprise a circular deformable plate including a reflective face, said plate being connected to, and surrounded by, a rigid and thick ring, the latter being extended outwardly by a plurality of arms. Each arm is connected to a pair of actuators intended to apply a force or a pair of forces at the periphery of the ring to deform the plate, and thus deform the wavefront being reflected on the reflective face of said plate. In order to achieve a satisfactory deformation and to reduce the risk of altering the plate, the latter further has a significant thickness with a specific and thick central pupil.

While they are generally satisfactory in their intended application field (astronomy), these known adaptive mirrors still have some drawbacks.

Indeed, the design of these known mirrors requires the implementation of a large number of actuators, since each arm shall be equipped with a pair of actuators to obtain a desired deformation amplitude in particular. Afterwards, the ring being relatively rigid and thick and the plate also having a relatively large thickness, it is necessary to size the actuators accordingly so they exert a sufficient torque on the edges of the plate via the ring to deform that plate, the entire system being relatively heavy. Finally, the arms themselves shall be rigid and thick, so as to be able to withstand the forces exerted by the pairs of actuators associated thereto. Furthermore, according to the current configurations of deformable mirrors with arms, to deform the plate as desired, it is necessary to use a large number of arms, and therefore a large number of actuators.

Thus, these different requirements and constraints increase the manufacturing cost and result in significant bulk and weight, as well as in a considerable inertia (or a response time) to the deformation and particularly difficult mounting and setting of these known mirrors.

Moreover, during manufacture, the actuators of each pair shall be positioned in an extremely accurate manner not only with respect to their respective arm, but also with respect to one another. Still more complicated, the numerous pairs of actuators shall be positioned in a particularly accurate and rigorous manner with respect to one another.

These last two constraints increase even more the manufacturing cost of these known mirrors, the proper set-up of the pairs of actuators turning out to be particularly complex in practice.

Hence, for these known mirrors, by their mere design, there is a significant risk of improper positioning of some actuators which increases the risk of inaccuracy in the control of the deformation of the reflective face of the plate, reflected by a defect in the correction or the desired introduction of an optical aberration in an incident wavefront. Hence, the reliability of these known mirrors is affected.

In fine, the known mirrors described in the foregoing turn out to be relatively bulky, heavy and expensive, and do not feature optimum reliability and responsiveness.

DISCLOSURE OF THE INVENTION

Consequently, the objects assigned to the invention aim at overcoming the different drawbacks mentioned before and at providing a new adaptive optical device that is robust, compact, light, whose manufacturing cost is controlled, easy and which is quick to implement.

Another object assigned to the invention aims at providing a new adaptive optical device with a simple and reliable structure.

Another object assigned to the invention aims at providing a new adaptive optical device whose design allows for an easy, quick and inexpensive set-up within an optical system.

Another object assigned to the invention aims at providing a new adaptive optical device adapted to generate a desired curvature (concavity or convexity) of its deformable plate in a particularly simple, reliable and controlled manner, for example in order to deform an incident wavefront in a controlled, accurate and quick manner.

Another object assigned to the invention aims at providing a new adaptive optical device whose implementation for introducing or correcting an optical aberration by reflection and/or refraction is particularly easy, while being easy and quick to service and to set.

Finally, another object assigned to the invention aims at providing a new adaptive optical device which, while having an extremely simplified and light construction, allows obtaining an excellent variety of deformation amplitudes in an accurate and controlled manner.

Moreover, another object assigned to the invention aims at providing a new method for manufacturing an adaptive optical device that is easy, quick and inexpensive to implement, while allowing obtaining an adaptive optical device that is particularly reliable, compact, responsive, light and robust.

The objects assigned to the invention are achieved using an adaptive optical device including a deformable plate intended to deform an incident wavefront by refraction and/or reflection, characterized in that it further comprises at least:
- legs fixedly attached to said deformable plate,
- a frame fixed with respect to said deformable plate,
- a plurality of peripheral actuators,
- each leg comprising a movable portion connected to at least one respective of the peripheral actuators so the latter could locally deform said leg so that the latter transmits a deformation force to said deformable plate, each leg further comprising a respective fixed portion which is fixedly attached to said frame so as to be immobilized with respect to the latter.

The objects assigned to the invention are also achieved using a method for manufacturing an adaptive optical device including a primary step of making or providing a deformable plate intended to deform an incident wavefront by refraction and/or reflection, the method being characterized in that it further comprises at least:
- a secondary step of making legs fixedly attached to said deformable plate,
- an equipment step, during which a respective movable portion of each leg is connected to at least one respective actuator, so that the latter could locally deform said leg so that the latter transmits a deformation force to said deformable plate,
- a fastening step, during which a respective fixed portion of each leg is fixedly attached to a frame fixed with respect to said deformable plate so as to be immobilized with respect to the latter.

BRIEF DESCRIPTION OF THE DRAWINGS

Other particularities and advantages of the invention will appear and come out in more detail upon reading the description made hereinafter, with reference to the appended drawings, provided only as illustrative and non-limiting examples, wherein.

BETTER WAY FOR CARRYING OUT THE INVENTION

According to a first aspect, illustrated in the figures, the invention concerns an adaptive optical device 1.

Hence, the adaptive optical device 1 is advantageously intended to be used in a system requiring the use of adaptive optics, for example a microscopic observation system, an astronomic observation system, an atmospheric turbulence visual correction system, an image magnification or reduction system, a zooming system, an image distortion system, or an ophthalmologic imaging system.

According to the present invention, and as represented in the figures, the adaptive optical device 1 includes a deformable plate 2 intended to deform an incident wavefront by refraction and/or reflection.

Preferably, the adaptive optical device 1 constitutes a deformable mirror and/or an adaptive lens. For example, the adaptive optical device 1 is intended to introduce or correct an optical aberration in said light wavefront (or ray). Hence, the adaptive optical device 1 is advantageously designed, in particular when it constitutes a deformable mirror, so as reflect an incident wavefront dynamically, that is to say in a modifiable, and controlled, manner, for example in order to introduce or correct said optical aberration in said wavefront. Preferably, the adaptive optical device 1 is designed, in particular when it constitutes an adaptive lens, so as to refract a wavefront dynamically, that is to say in a modifiable, and controlled, manner, for example in order to introduce or correct said optical aberration in said wavefront. For example, said adaptive lens constitutes a refringent medium, for example more refringent than air or the environment of said lens, so as to deform said incident wavefront. For example, said deformable plate 2 forms one of the faces of said adaptive lens, and the latter comprises at least one refractive material, such as a fluid in particular, or a solid, and even a gas, said refractive material having a refractive index different from 1, in particular greater than 1. Preferably, said adaptive lens is at least partially deformable, in particular at the level of said deformable plate 2.

Advantageously, in the absence of any external influence, said deformable plate 2 has, by its mere construction, a general planar or curved shape. For example, said deformable plate 2 is slightly cambered, that is to say convex (or slightly concave, depending on the viewpoint). Preferably, said convexity (or concavity, depending on the viewpoint) of said deformable plate 2 is small enough, that is to say having a relatively large radius of curvature in comparison with the dimensions of said deformable plate 2, for the surface of said (slightly) cambered deformable plate 2 to be considered, at least locally (that is to say at least over a fraction of the surface area of said deformable plate 2), as a planar surface.

Preferably, and as represented in the figures, at rest, said deformable plate 2 extends substantially according to a first mean plane of extension P. Thus, at rest, that is to say advantageously in the absence of any deformation mechanical load exerted on said deformable plate 2, for example by an actuator, said plate is advantageously inscribed (whether it is planar or slightly cambered) within said first mean plane of extension P, which preferably intersects said deformable plate 2 across most, almost all or all of its thickness.

Advantageously, said deformable plate 2 is a thin, deformable plate, which deforms in particular by the action of an external force exerted at its surface, in particular a force exerted by at least one actuator.

Preferably, said deformable plate 2 is manufactured from a material that is relatively flexible, yet having some mechanical strength so that it deforms only a little or not at all as long as it is not subjected to a minimum external pressure or tension. Thus, advantageously, said deformable plate 2 has some mechanical strength, is not flabby, and has however some softness and some flexibility sufficient to undergo a slight elastic deformation, that is to say reversible, in particular when it is loaded in bending, in particular by actuators (which will be described in more detail hereinafter).

Preferably, said deformable plate 2 is mainly made of silicon, of metal (for example of steel or of aluminum), of an ally, of polymer(s), of composite material(s), of ceramic(s), of vitreous amorphous material(s) (for example of organic or mineral glass such as Pyrex), of quartz or derivatives thereof, or of an assembly of several different materials, in particular amongst the aforementioned materials. Advantageously, said deformable plate 2 has an average thickness substantially comprised between 5 and 500 µm. Preferably, for the function targeted by the invention, the deformable plate 2 has a relatively modest size. For example, said deformable plate 2 has a diameter (in particular in the case where the deformable plate 2 is circular) and/or a larger dimension (in particular a length, such as in the case where the deformable plate 2 is elliptical or rectangular) comprised between 5 and 300 mm.

Preferably, and as illustrated in the figures, said deformable plate 2 has a geometric center C, for example a center of gravity and/or a barycenter.

Figure 11:
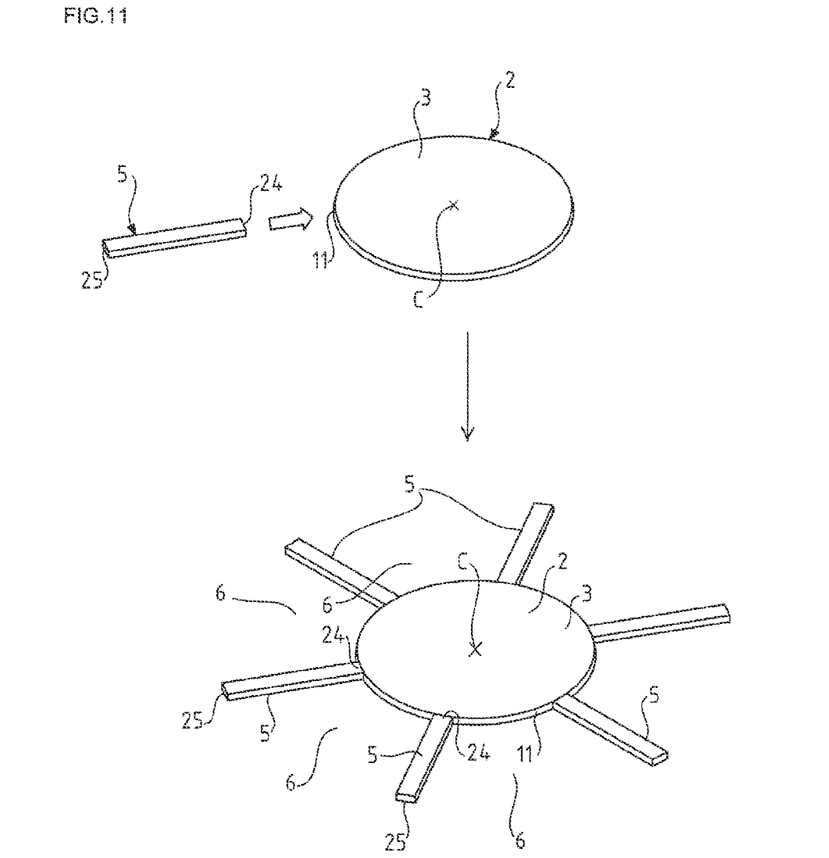
FIG. 11 illustrates, according to a perspective view, a portion of a second alternative of a manufacturing method according to the invention for making the adaptive optical device of FIG. 9.
Figure 12:
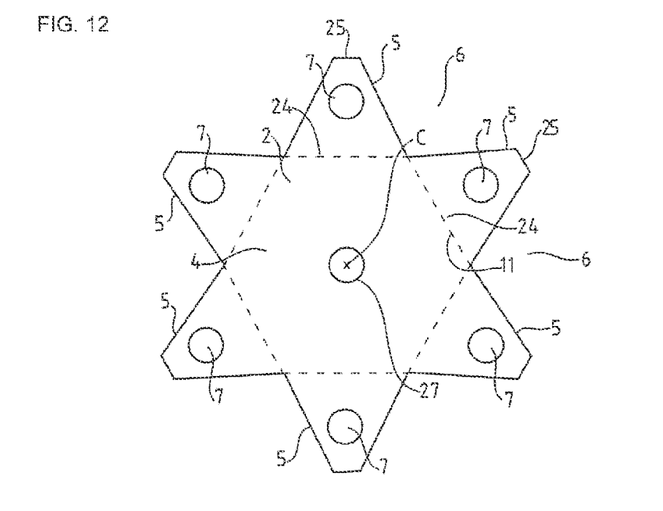
FIG. 12 illustrates, according to a perspective view, an embodiment of a hexagonal deformable plate and of trapezoidal legs of an adaptive optical device of the invention, viewed on the hidden side of the plate.

Preferably, said deformable plate 2 has a peripheral edge 11. For example, and as illustrated in particular in FIGS. 1, 7 to 11, 13 and 14, said deformable plate 2 has a substantially circular or elliptical general shape. Thus, said peripheral edge 11, which delimits said deformable plate 2, advantageously descries, in these last two examples, a circle or an ellipse. Alternatively, said deformable plate 2 has a triangular, rectangular, square, trapezoidal shape, or any other suitable geometry or polygon. Thus, said peripheral edge 11 alternatively describes a polygon, for example a rectangle, or a hexagon, as illustrated in FIG. 12.

Figure 15:
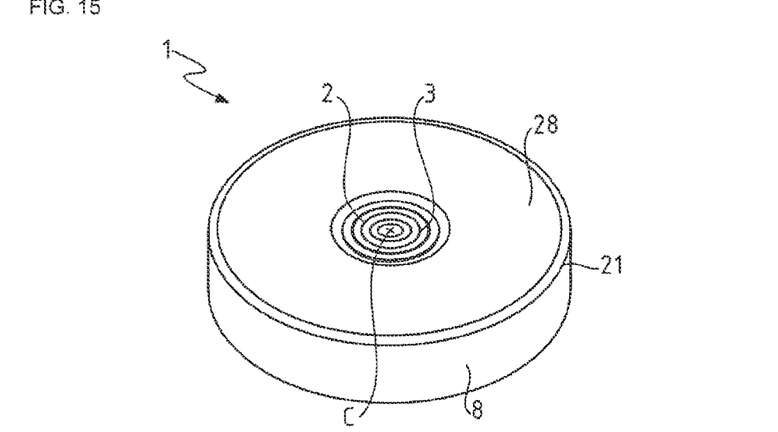
FIG. 15 illustrates, according to a perspective view, an adaptive optical device according to the invention whose deformable plate is deformed by the actuators so as to have contour lines of an example of a deformation mode.

According to the invention, the deformable plate 2 has an incident face 3 intended to receive said wavefront. Preferably, said incident face 3 comprises or forms an optical surface, useful to carry out an application in an adaptive optical system, said optical surface being preferably intended to receive said incident wavefront. Said incident face 3 (and more specifically said optical surface) preferably has a substantially smooth surface, intended to receive said incident wavefront, said deformable plate 2 and/or said incident face 3 being designed so as to introduce an optical aberration or correct it when said deformable plate 2 is actively deformed. Thus, said deformable plate 2 is preferably intended to be reversibly deformed according to several deformation configurations, one of which is illustrated in FIG. 15. Thus, said incident face 3 is advantageously plain (that is to say made integrally in one-piece, having a visual, physical and mechanical continuity), without any unevenness or asperity, and is preferably intended to receive said incident wavefront.

Advantageously, said deformable plate 2 is designed so as to receive, via said incident face 3 in particular, said incident wavefront and to deform it in a controlled manner so as to emit a deformed (in particular reflected and/or refracted) wavefront. More specifically, said deformable plate 2 is preferably designed so as to receive an incident wavefront in order to:

reflect it (with a deformation) in the form of a reflected wavefront, in particular when the adaptive optical device 1 is a deformable mirror, and/or refract it (that is to say transmit it with a deformation) in the form of a refracted wavefront, in particular when the adaptive optical device 1 is an adaptive lens.

For example, said reflected and/or refracted beam has either an optical aberration that is not present in the incident wavefront, or a correction of an optical aberration present in the incident wavefront, or both. Preferably, said reflected and/or refracted wavefront is therefore deformed in comparison with said incident wavefront. In other words, the adaptive optical device 1 is advantageously designed so as to deform the incident wavefront in a controlled manner, and that being so according to several successive configurations since the adaptive optical device 1 is, by definition, adaptable according to the desired modification, the incident wavefront, the angle of incidence of the latter, the medium, etc. Optionally, the adaptive optical device may be designed so as to reflect a portion of the incident wavefront and to refract another one.

Advantageously, said deformable plate 2 further has a hidden face 4 opposite to said incident face 3. Thus, advantageously, said incident 3 and hidden 4 faces lie on opposite faces of said deformable plate 2. Thus, said deformable plate 2 advantageously has a generally planar, or alternatively curved, shape, at rest, wherein said incident 3 and hidden 4 faces are separated by the thickness of said deformable plate 2, said thickness being preferably relatively small in comparison with radial directions of extension of said faces 3, 4 of said deformable plate 2. According to a first alternative, said incident face 3 is (at least locally) substantially parallel to said hidden face 4. According to another alternative, in particular in some cases where the adaptive optical device 1 is an adaptive lens (or a specific deformable mirror), said incident face 3 is not parallel to said hidden face 4, said deformable plate 2 being for example cambered on two opposite faces of said deformable plate 2, that is to say in other words substantially convex on both said incident face 3 and said hidden face 4, or on the contrary substantially concave on both said incident face 3 and said hidden face 4.

In the case where the adaptive optical device 1 constitutes said deformable mirror, said incident face 3 advantageously forms a reflective face. Of course, in the case where the adaptive optical device 1 constitutes said adaptive lens, the incident ray advantageously crosses said deformable plate 2 by entering the latter via said incident face 3 and by exiting said deformable plate 2 via said hidden face 4. Hence, the thickness of said deformable plate 2 may be involved in the deformation of the incident wavefront, whereas said hidden face 4 is then «hidden» only from the incident wavefront perspective.

Advantageously, said deformable plate 2 is intended to undergo forces and/or pairs of compressive and/or tensile forces, applied for example at the periphery of said deformable plate 2, and more specifically at said peripheral edge 11, allowing deforming said deformable plate 2 in a reversible (that is to say advantageously in the elastic domain), controlled, and appropriate manner, that is to say in a satisfactory manner for the adaptive optical device 1 to fill its function in an adaptive optical system. Preferably, said forces and/or pairs of forces are applied on the side of said hidden face 4 and/or on the latter, for example in order to generate a convexity or concavity on said opposite incident face 3.

Preferably, said incident 3 and hidden 4 faces are made in one-piece with said deformable plate 2, for example machined in the same material. Alternatively, said deformable plate 2 is constituted by several plate portions affixed, for example glued, to one another, one of said plate portions comprising said incident face 3 (or a portion of the latter, for example said optical surface), and another one of said plate portions comprising said hidden face 4.

According to the invention, and as illustrated in the figures, the adaptive optical device 1 further comprises legs 5 fixedly attached to said deformable plate 2. Thus, said legs 5 are advantageously secured to said deformable plate 2, and that being so in a permanent, non-reversible, manner. In other words, said legs 5 are preferably in embedded connection with said deformable plate 2. Advantageously, said legs 5 are distinct from each other, that is to say preferably not connected directly to each other, said legs 5 being also advantageously away from each other. For example, each leg 5 is in the form of a portion of a thin, deformable plate, which deforms and/or advantageously moves, for example folds, by the action of an external force exerted on its surface, in particular a force exerted by at least one actuator. Preferably, said legs 5 are attached directly to said deformable plate 2, without any notable intermediate element (other than possible glue, weld bead, etc.), and preferably without any intermediate element that is rigid and/or has some mechanical strength.

Figure 2:
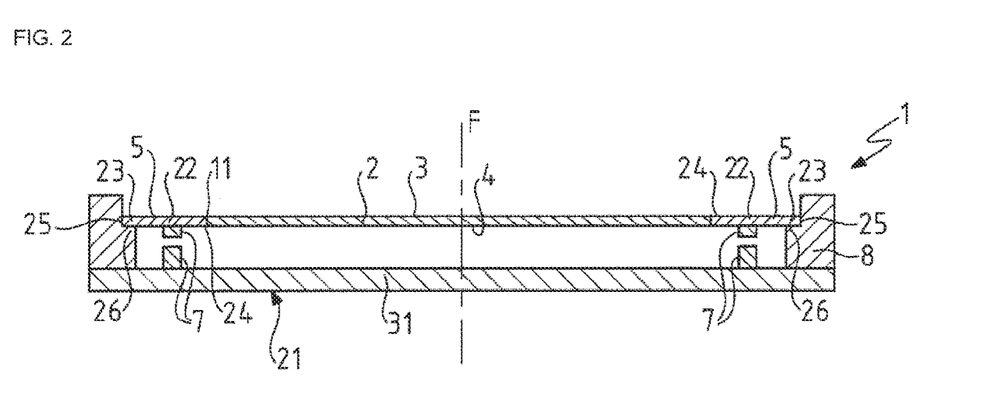
FIG. 2 illustrates, according to a schematic side view, a section according to a sagittal plane of the adaptive optical device of FIG. 1.
Figure 3:
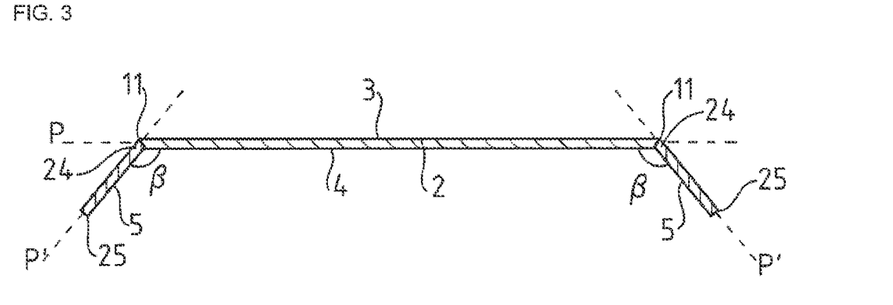
FIG. 3 illustrates, according to a schematic side view, a section according to a sagittal plane of a particular embodiment of the adaptive optical device, with an obtuse dihedral angle between the deformable plate and the legs, with no frame and no actuator.
Figure 4:
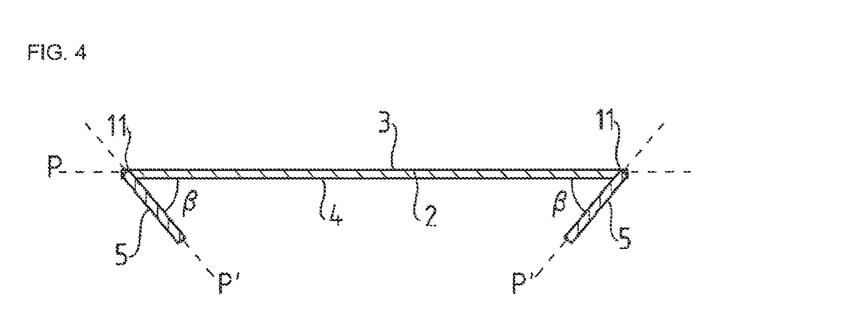
FIG. 4 illustrates, according to a schematic side view, a section according to a sagittal plane of another particular embodiment of the adaptive optical device, with an acute dihedral angle between the deformable plate and the legs, with no frame and no actuator.

Preferably, none of said legs 5 is directly secured to other said legs 5, that is to say it could be possible for example to fold one of said legs 5 without other said legs 5 being folded or moved, or at least without these being fold or moved in the same manner as said considered leg 5. Preferably, said legs 5 are attached to said deformable plate 2 via said peripheral edge 11, and could be substantially elongate. Preferably, each leg 5 extends, from said deformable plate 2, radially with respect to said geometric center C, for example outwardly, as illustrated in particular in FIGS. 1 to 3 and 7 to 14, or according to another example inwardly, as illustrated in FIG. 4, preferably from said peripheral edge 11. Advantageously, as illustrated in the figures, said legs 5 are angularly distributed evenly around said geometric center C. As illustrated in the figures, all of said legs 5 are for example substantially identical to one another, although it could also possible that some legs 5 are relatively larger and/or thicker and/or more rigid and/or longer than others. According to a particular embodiment, each leg 5 extends in a regular manner on either side of one (single) respective longitudinal axis of extension, preferably so that there is a rectilinear straight segment passing through the material forming the leg 5 throughout the latter, as illustrated in the embodiments of FIGS. 1 to 4 and 7 to 14. Preferably, each axis of extension passes through a central axis, which extends substantially perpendicularly to the deformable plate 2 and passes through said geometric center C.

Advantageously, as illustrated in the particular embodiments represented in the figures, said peripheral edge 11 is free, except for its connections with said legs 5. In other words, the peripheral edge 11 is preferably not connected to any structure (other than the deformable plate 2), except for said legs 5. Such a «free» peripheral edge configuration 11 allows obtaining a wide variety of possible deformation amplitude of said deformable plate 2 and that being so without exerting any large force on the legs 5, for example using the peripheral actuators 7 described in more details hereinafter.

Preferably, the peripheral edge 11 does not advantageously have a significant over-thickness, and for example is not more than three times, preferably not more than twice, thicker than the rest of the deformable plate 2. In particular, the peripheral edge 11 advantageously has a thickness similar to the rest of the deformable plate 2, possibly with a tolerance less than or equal to 25%, more preferably less than or equal to 15%. Preferably, as illustrated in the figures, each leg 5 is separated from the legs 5 adjacent thereto by spaces 6. Thus, each leg 5 is advantageously bordered by two of said spaces 6, separated from each other by said leg 5. For example, said spaces 6 may be quite wide and in particular as wide as or wider than said legs 5, as illustrated in the figures, or rather narrow, narrower than said legs 5, said spaces 6 then forming, preferably through, grooves (or slots). Said legs 5 preferably not being connected directly to each other, said spaces 6 are advantageously open-through. Advantageously, said plate 2 and said legs 5 attached to the latter together form a deformable body in one-piece in the form of a star with several branches, each branch being formed by one of said legs 2. Alternatively, said deformable plate 2 and said legs 5 together form a circular general structure, each leg 5 advantageously forming a respective peripheral portion of a respective circular sector of said set with a circular general structure. Optionally, each of said legs 5 has a petal-like shape and arrangement surrounding said deformable plate 2. Advantageously, the peripheral edge 11 has, in said spaces 6, free portions, which are not therefore connected to any structure (other than the deformable plate 2, of course, the free portions belonging to said deformable plate 2). More specifically, the free portions may partially delimit the spaces 6. In other words, advantageously, the peripheral edge 11 comprises, between each pair of adjacent legs 5, a respective free portion (as mentioned before) which is not connected to any structure.

According to a second aspect, the invention concerns a method for manufacturing an adaptive optical device 1. Preferably, the method is implemented to manufacture the adaptive optical device 1 described hereinabove and hereinafter. Hence, the previous, as well as the following, description regarding the adaptive optical device 1 preferably also applies to the manufacturing method according to the invention, and vice versa, the following description regarding the manufacturing method preferably also applies to the adaptive optical device 1 according to the invention.

Thus, according to the second aspect of the invention, the manufacturing method includes a primary step of making or providing a deformable plate 2 intended to deform an incident wavefront by refraction and/or reflection.

Figure 1:
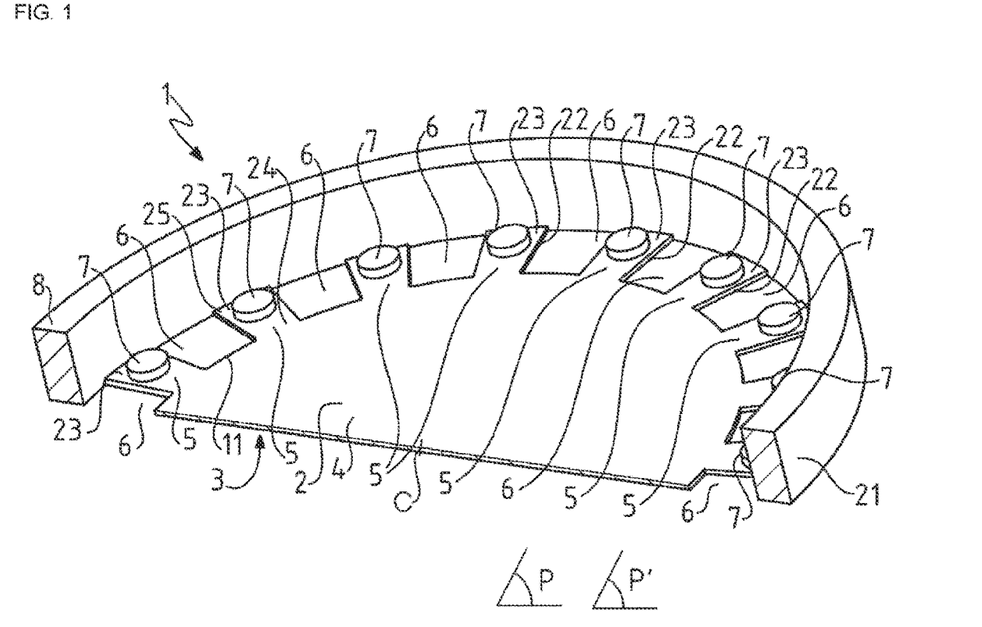
FIG. 1 illustrates, according to a perspective view, a section according to a sagittal plane of an example of an adaptive optical device of the invention, viewed on the hidden face side of the plate.
Figure 13:
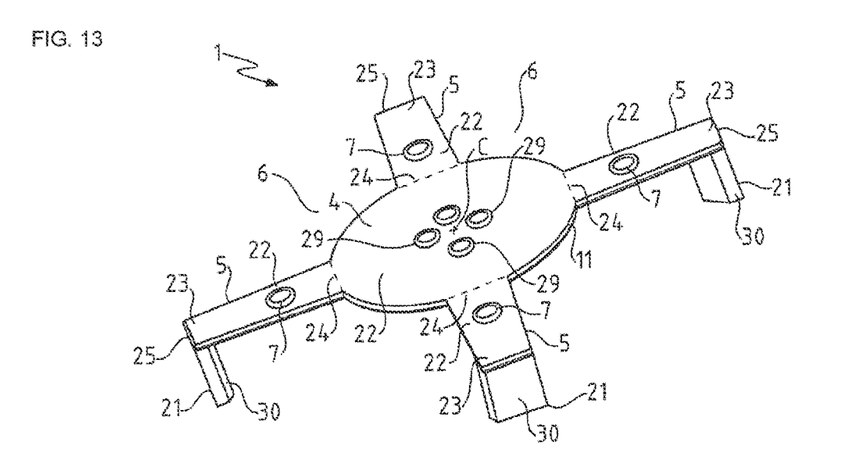
FIG. 13 illustrates, according to a perspective view, another embodiment of a deformable plate and of legs of an adaptive optical device of the invention, viewed on the hidden face of the plate.
Figure 14:
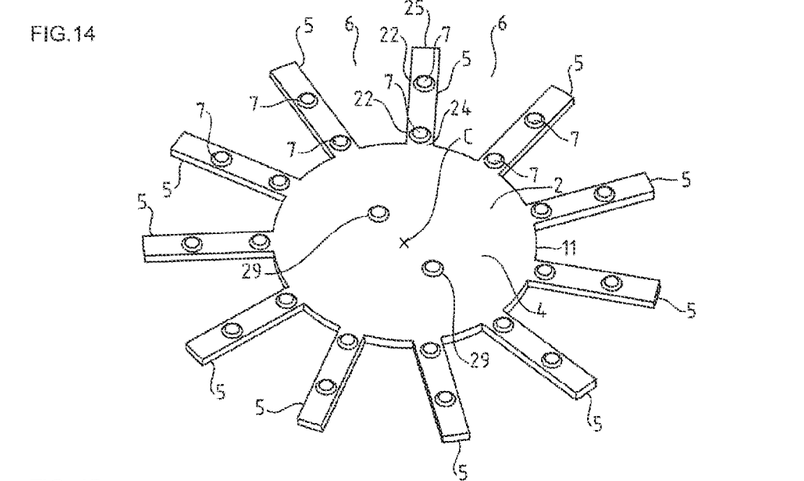
FIG. 14 illustrates, according to a perspective view, a particular embodiment of a deformable plate and of legs according to an adaptive optical device of the invention, viewed on the hidden face of the plate.

Still according to the invention, the manufacturing method further comprises at least one secondary step of making legs 5 fixedly attached to said deformable plate 5. For example, as illustrated in the figures, the adaptive optical device 1 preferably comprises at least four legs 5, in particular between four and twenty legs 5, for example eight legs 5 as illustrated in FIGS. 7 to 10, or according to another example four legs 5 as illustrated in FIG. 13, or according to still another example six legs 5 as illustrated in FIGS. 11 and 12, or according to still another example eighteen legs 5 as illustrated in FIG. 1, or according to still another example eleven legs 5 as illustrated in FIG. 14. Hence, the number of legs 5 of the adaptive optical device 1 could be even, as illustrated in most figures, or odd, as illustrated in FIG. 14.

Figure 9:
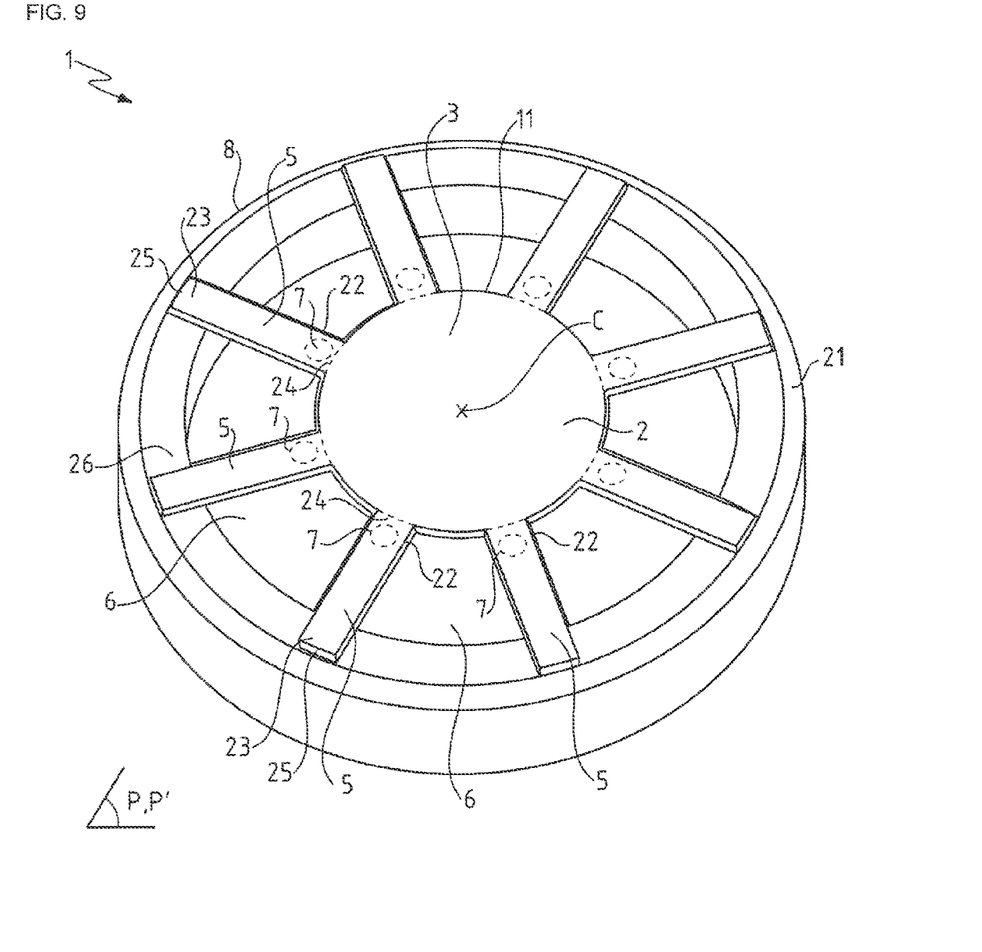
FIG. 9 illustrates, according to a perspective view, an example of an adaptive optical device of the invention.
Figure 10:
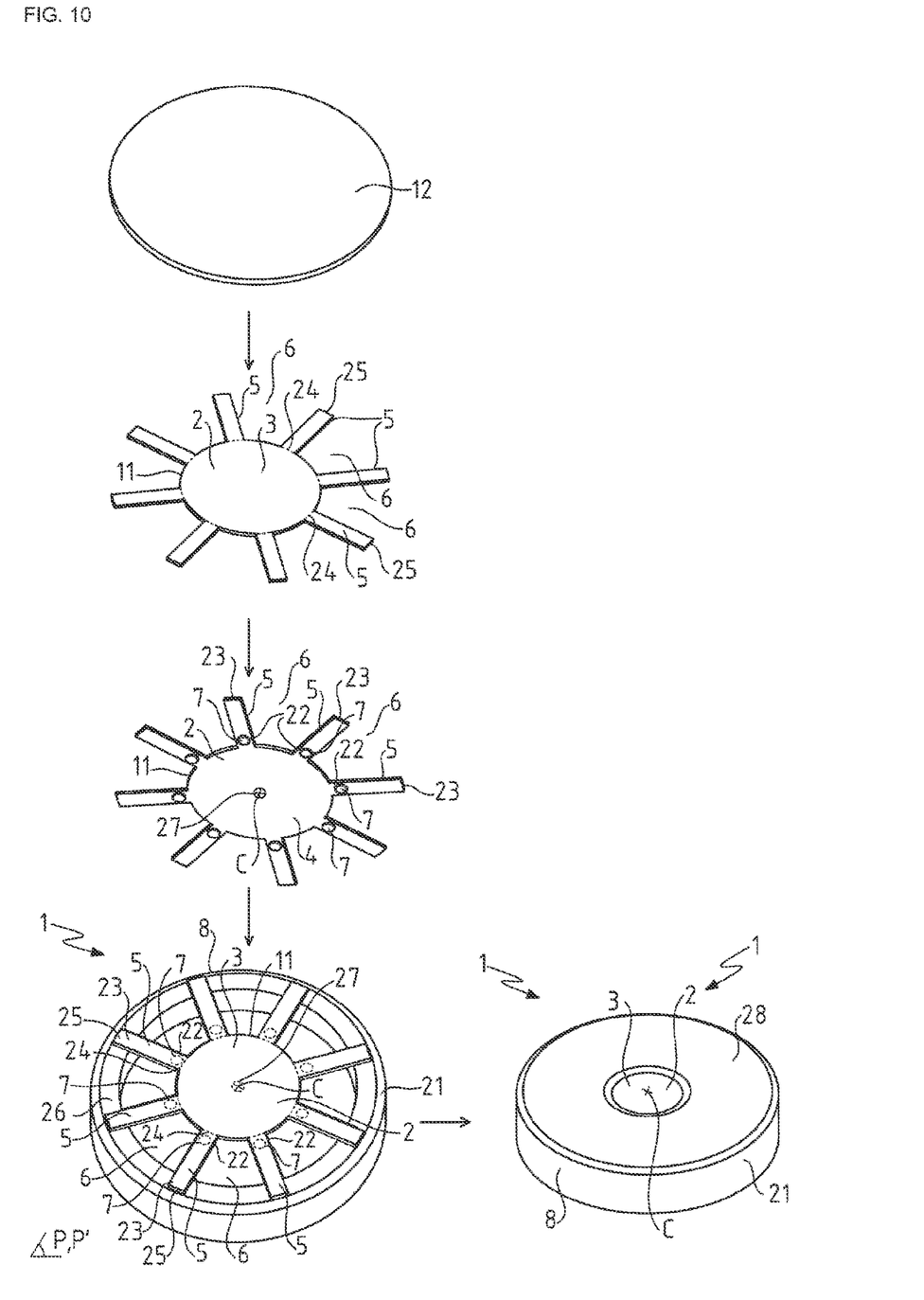
FIG. 10 illustrates, according to a perspective view, a first alternative of a manufacturing method according to the invention for making the adaptive optical device of FIG. 9, provided in addition with a central actuator.

According to a first alternative, illustrated in particular in FIGS. 1, 7 to 10 and 12 to 14, said legs 5 are integrally made with said deformable plate 2, said primary and secondary making steps being for example at least partially concomitant and comprising in particular a common step of cutting a raw plate 12 to form said legs 5 and said deformable plate 2, as illustrated in FIG. 10. In the last case, the peripheral edge 11 of the deformable plate 2 may in particular be formed at least partially by a virtual limit between the body of the plate 2 and the leg 5, as represented by the dotted lines at the tip of the legs 5 in FIGS. 9, 12 and 13. Hence, according to this example, said plates 5 are preferably made from the same raw plate 12, for example, by forming said spaces 6 in the thickness of said raw plate 12 in order to form said legs 5, delimiting at the same time a central area which advantageously includes no space 6 and which forms at least part of said deformable plate 2. Thus, each leg 5 is advantageously separated from the legs 5 that are immediately adjacent thereto by a clearance (said space 6) formed in the thickness of said raw plate 12. Preferably, said raw plate 12 is made in one-piece. According to this example, said deformable plate 2 (or at least one portion thereof), and/or said legs 5 are preferably formed at least partially, and preferably entirely, from a cutout of the edges of said raw plate 12, as illustrated by the first two drawings of FIG. 10. One of the advantages of the common cutting step is that it allows forming the legs 5 and the deformable plate 2 in one-piece and in one single operation, thereby guaranteeing an excellent and easily replicable mechanical strength.

According to a second alternative, illustrated in particular in FIG. 11, during said secondary making step in particular, said legs 5 are affixed on said deformable plate 2. For example, said secondary making step comprises a step of securing said legs 5 to said deformable plate 2, for example by welding, gluing and/or brazing. According to this alternative, said deformable plate 2 on the one hand and said legs 5 on the other hand are formed independently of each other. In this last case, the adaptive optical device 1 comprises a welding and/or gluing interface between each leg 5 and said deformable plate 2, preferably at the level of said peripheral edge 11 of the deformable plate 2. Said spaces 6 are then simply formed by attaching said legs 2 to said deformable plate 2 at a distance from each other, during said secondary making step. One of the advantages of the securing step is that it allows forming the legs 5 and the deformable plate 2 separately, easier to manufacture for example separately by molding, machining or any other suitable means.

Preferably, during said securing step in particular, at least part (or the entirety) of said legs 5 is secured to said deformable plate 2:
  over an edge of said deformable plate 2, for example on said peripheral edge 11, as illustrated in FIG. 11,
  over said deformable plate 2, and more specifically on said incident face 3, said legs 5 being for example partially pressed beforehand against said incident face 3, and/or
  under said deformable plate 2, and more specifically over said hidden face 4, said legs 5 being for example partially pressed beforehand against said hidden face 4.

Of course, it is quite possible for example that some of said legs 5 are secured on an edge of said deformable plate 2, whereas others are secured over and/or under said deformable plate 2, all appropriate combinations being possible depending on the desired use and design of the adaptive optical device 1.

According to still another alternative, said deformable plate 2 and said legs 5 are formed from a molding of a molded set in one-piece advantageously comprising said deformable plate 2, said legs 5 attached to the latter and separated from each other by said spaces 6. According to another alternative, some of said legs 5 are attached to said deformable plate 2, whereas others of said legs 5 are integrally made with said deformable plate 2, in particular by molding and/or cutting. According to this example, the primary step of making or providing the deformable plate 2 and the secondary step of making said plurality of legs 5 are concomitant during a step of molding a molded set, advantageously in one-piece, comprising said deformable plate 2 and said legs 5. In this last example, said molded set is molded for example with a melting material so as to form the deformable plate 2 provided with lateral legs separate from each other, said lateral legs forming said legs 5. According to still another alternative, said deformable plate 2 is provided, that is to say delivered ready-to-use, during said primary step.

According to the invention, the adaptive optical device comprises a plurality of peripheral actuators 7. Still according to the invention, each leg 5 comprises a movable portion 22 connected to at least a respective one of the peripheral actuators 7 for the latter to be able to locally deform said leg 5 so that the latter transmits a deformation force to said deformable plate 2. Hence, said movable portion 22 preferably consists of a portion of said leg 5 connected to said peripheral actuator 7 and made movable by actuation of the latter. Thus, each movable portion 5 is preferably connected to one of said peripheral actuators 7. More preferably, each movable portion 22 is connected to one single respective peripheral actuator 7 amongst the plurality of said peripheral actuators 7. Conversely, in an advantageous manner, each peripheral actuator 7 is connected to only one of said movable portions 22. Thus, each peripheral actuator 7 is preferably connected to only one of said legs 5.

Advantageously, each peripheral actuator 7 is thus intended to displace said movable portion 22 so as to deform said deformable plate 2, said leg 5 transmitting a portion of the deformation imparted by said peripheral actuator 7 to said deformable plate 2 in particular at the level of said peripheral edge 11. In other words, the adaptive optical device 1 preferably comprise said plurality of peripheral actuators 7, each of them being connected to a respective one of said legs 5 to deform it at the level of said respective movable portion 22 of said leg 5. Advantageously, each respective peripheral actuator 7 is designed so as to exert a compressive or tensile force on the corresponding leg 5, so as to cause local displacement and/or deformation of said leg 5, at the level of a portion of this leg 5 called movable portion 22. This displacement and/or this deformation results in the application of a deformation force on the deformable plate 2, preferably via said peripheral edge 11, at the level of which said leg 5 is advantageously connected, in particular in order to deform the incident wavefront when it is reflected on said incident face 3 and/or is refracted via said deformable plate 2. This allows deforming said deformable plate 2 effectively to introduce or correct an optical aberration in the wavefront reflected and/or refracted by said deformable plate 2, by deforming at least locally the curvature of said deformable plate 2 (and therefore advantageously the curvature of its incident face 3). This results in that said curvature varies at least locally according to the force exerted by said peripheral actuator 7 on said leg 5. For example, each peripheral actuator 7 is positioned on the same side of said deformable plate 2, preferably on the side of said hidden face 4, or alternatively, on the side of said incident face 3. Preferably, all peripheral actuators 7 lie on the same side of the first mean plane P. Alternatively, at least one of the peripheral actuators 7 is positioned on the hidden face 4 side and at least another one of the peripheral actuators 7 is positioned on the incident face 3 side, said (two) peripheral actuators 7 being thus positioned on either side of the first mean plane P. Thus, preferably, each leg 5 has both a sufficient flexibility so as to be locally deformed by said actuator 7 to which it is connected when the latter displaces said movable portion 22, and some sufficient mechanical strength to influence the shape of said deformable plate 2 by transmitting the deformation force via said peripheral edge 11. Advantageously, said peripheral actuator 7 may be of any type (piezoelectric, magnetic, in two portions, mechanical, with screw, etc.), including those that are known in the considered technical field. For example, said peripheral actuator 7 is connected to said leg 5 via a glue point, thereby defining said movable portion 22, and transmits a tensile or compressive force locally at the surface of said movable portion 22 to displace it and thus deform said deformable plate 2, the latter being secured to said plate 5.

According to the first aspect of the invention, the adaptive optical device 1 further comprises a frame 21 fixed with respect to said deformable plate 2. In other words, said frame 21 advantageously remains immobile when said deformable plate 2 is deformed to deform an incident wavefront in a controlled manner. For example, said peripheral actuator 7 may be of the magnetic type, in two portions, as illustrated in particular in FIG. 2, a movable portion of the peripheral actuator 7 being connected to the corresponding leg 5, whereas an immovable portion of the peripheral actuator 7 is connected to said frame 21. In general, it is possible to consider that, advantageously, said frame 21 is also fixed with respect to the peripheral actuator 7, which is movable (or, to the least, its active portion is movable).

According to a particular example, the peripheral edge 11 is not (directly) connected to the frame 21 (but it is indirectly connected through the legs 5).

For example, said frame 21 comprises, as illustrated in FIGS. 1, 2, 9, 10 and 14, a peripheral body having a shape of the same type as that of the deformable plate 2, for example a circular peripheral body when the deformable plate 2 is circular, or a rectangular peripheral body when said deformable plate 2 is rectangular, etc. For example, in particular in the case where the deformable plate 2 has a substantially circular or elliptical general shape, said frame 21 advantageously comprises a rigid ring 8 at the middle of which said deformable plate 2 provided with said legs 5 is positioned. In particular, said ring 8 (and more generally said peripheral body) is designed so as to surround said deformable plate 2 and said legs 5. For example, said ring 8 is shaped like a cylinder whose guide curve is for example a circle or a polygon.

The frame 21 may be formed in one-piece, that is to say in one single block in the same manner as the ring 8, as illustrated in most of the figures (and for the ring, FIGS. 1, 9, 10 in particular), or alternatively it could have a discontinuous aspect, as illustrated in FIG. 13, said frame 21 comprising for example arms 30 (or screws or rivets) connected to said legs 5 and positioned at a distance from each other, said arms 30 therefore being fixed with respect to said deformable plate 2, and preferably fixed with respect to said peripheral actuators 7. Optionally, said frame 21 further comprises a support 31, as illustrated in FIG. 2, said support 31 being for example connected via an embedded connection to said ring 8, which rests on said support 31. In the peripheral 7 (or additional 29 as will be seen later on) actuator may partially rest against said support 31 and be connected to the latter in translation, that is to say an active portion of the peripheral 7 (or additional 29) actuator is designed so as to be able to perform a translational movement relative to said support 31, and more generally to said frame 21.

According to the invention, and as illustrated in particular in the figures, each leg 5 further comprises a respective fixed portion 23 which is fixedly attached to said frame 21 so as to be immobilized relative to the latter. Preferably, said fixed portion 23 is immobilized at least in translation according to at least one fastening direction F relative to said frame 21, that is to say said fixed portion 23 is fastened to said frame 21 so as not to be able to perform a translational movement relative to the latter according to at least said fastening direction F, and therefore so as not to be able to deviate from or approach the latter according to at least said fastening direction F, as illustrated in particular in FIG. 2. Preferably, said fastening direction F is formed by a line normal to the incident face 3, that is to say a line normal at one point of the surface of said deformable plate 2 on the incident face 3 side. According to one example, said fastening direction F is formed, in particular when the deformable plate 2 is cambered (but this also applies when it is flat)), by a line perpendicular to a plane tangent at one point of said incident face 3. According to another example, compatible with the previous one, said fastening direction F is formed, in particular when the deformable plate 2 is substantially planar (but this also applies when it is slightly cambered), by a line perpendicular to said first mean plane of extension P.

According to a first alternative, said fixed portion 23 does not have any degree of freedom relative to said frame 21, but according to other alternatives, said fixed portion 23 has one or several degree(s) of freedom relative to said frame 23.

For example, said fixed portion 23 is:
  in embedded connection with said frame 21, and therefore without any degree of freedom relative to the latter, or
  in pivot connection with said frame 21, and therefore with at least one degree of freedom relative to the latter, or
  in ball-joint connection with said frame 21, and therefore with at least two degrees of freedom relative to the latter.

Said fixed portion 23 may also have one or two degrees of freedom in translation relative to said frame 21 according to one or two direction(s) of free translation, which are therefore advantageously different from said fastening direction F. Hence, said direction(s) of free translation is/are preferably non-coincident and non-parallel with said fastening direction F, and are for example perpendicular to the latter and/or perpendicular to each other.

Thus, said fixed portion 23 is dependent of the frame 21, without being able to deviate from the latter, and preferably without being able to move relative to the latter (embedding). Nonetheless, as disclosed hereinbefore, it is alternatively possible that the fixed portion 23 could change its orientation with respect to the frame 21 (pivot or ball-joint connection) while remaining attached to the latter at a fixed point. Thus, said fixed portion 23 of the leg 5 is advantageously fixed at least in translation according to an axis locally perpendicular to the deformable plate 2 (for example corresponding to the fastening direction F in the example illustrated in FIG. 2), the other degrees of freedom (two translations and three rotations) could be fixed or not. In other words, the fixed portion 23 is preferably immobilized in translation relative to the frame 21 according to at least said fastening direction F, but said fixed portion 23 could possibly have one or two degree(s) of freedom in translation and/or one, two or three degree(s) of freedom in rotation relative to said frame 21, according to the alternatives, or have no degree of freedom relative to said frame 21 that is to say be completely immobilized relative to the latter.

Thus, each leg 5 advantageously has said respective fixed portion 23, which is firmly connected to said frame 21 so as to be immobilized relative to the latter, that is to say immobilized relative to the latter at least in translation. Preferably, said fixed portion 23 is attached with said frame 21 in direct or almost direct contact with the latter. Advantageously, said fixed portion 23 does not move, in translation in particular, relative to said frame 21, which is advantageously fixed, regardless of the local deformation of the leg 5 or more specifically the displacement of said movable portion 22, and regardless of the deformation of said deformable plate 2. Advantageously, this allows applying pairs of forces at the surface of said deformable plate 2, on the one hand by displacing each leg 5 thanks to the respective peripheral actuator 7 connected to the latter at the level of said movable portion 22, and on the other hand by exerting a «biasing force» or a «holding force» on said leg 5 thanks to its fixed portion 23 to said frame 21, without any excessive force from said peripheral actuator 7, fastening of each of said respective fixed portions 23 of the legs 5 to said frame 21 ensuring control of the deformation of said deformable plate 2. Hence, the combination, by the considered leg 5, of the fixed portion 23 and of the movable portion 22 will advantageously allow accurately controlling the amplitude of deformation of the deformable plate 2 and at the same time rationalizing the number of peripheral actuators 7 and/or their power, as well as the number of legs 5, thanks to the lever effect and/or the pair created on the one hand thanks to the deformation force exerted by the peripheral actuator 7 and, on the other hand, thanks to the holding or biasing force (constant and without any need for calibration) of the fixed portion 23. For example, the number of actuators (the peripheral ones 7 and/or the additional ones 29, which will be described hereinafter) corresponds to exactly or approximately (for example, +/−2) the number of possible deformation modes or profiles of said deformation plate 2.

In the case where the frame 21 is discontinuous, each of said arms 30 is for example fastened to a respective one of said legs 5 at the level of said respective fixed portion 23, as illustrated in FIG. 13. In the case where the frame 21 is made in one-piece, said frame 21, formed for example by said ring 8, is fastened to said legs 5 via said respective fixed portions 23 of these, as illustrated in FIGS. 1, 9 and 10 in particular. In any case, said frame 21 is preferably not in direct contact with said deformable plate 2.

According to the invention, the manufacturing method further comprises at least:
- an equipment step, during which a respective movable portion 22 of each leg 5 is connected to at least one respective actuator 7, so that the latter could locally deform said leg 5 so that the latter transmits a deformation force to said deformable plate 2,
- a fastening step, during which a respective fixed portion 23 of each leg 2 is fixedly attached to a frame 21 fixed with respect to said deformable plate 2 so as to be immobilized with respect to the latter.

In other words, during said equipment step, a respective peripheral actuator 7 is advantageously fastened to each leg 5, for example by gluing, welding, brazing, or any other suitable fastening means. In FIGS. 3 to 6, each peripheral actuator 7, non-represented in these figures, could for example be located under the corresponding leg 5.

Preferably, during said equipment step in particular, the peripheral actuators 7 are not directly connected to the deformable plate 2, and in particular to the peripheral edge 11 of the latter. On the contrary, in particular in order to deform said deformable plate 2 as well as said incident face 3, said peripheral actuators 7 are advantageously positioned so as to act on the deformable plate 2 only indirectly, through said plates 5. Hence, these are preferably distinct from said peripheral actuators 7. The use of the legs 5 in the adaptive optical device 1 of the invention allows for an excellent accuracy of deformation of said deformable plate 2, and therefore an enhanced accuracy of correction or introduction of optical aberrations in the incident wavefront, although it does not exclude, as such, the use of additional actuators 29 directly connected to the peripheral edge 11 of the deformable plate 2.

For example, during said fastening step, said legs 5 are riveted, screwed, glued, brazed, and/or welded to said frame 21. According to this example, during said fastening step, a portion of each leg 5 is attached with said frame 21, for example, with at least one rivet, at least one screw, glue, a weld, a braze, or any other suitable attachment means, so as to form the fixed portion 23 of the corresponding leg 5. Preferably, the equipment step also comprises a step of connecting a portion of each peripheral actuator 7 (and even of each additional actuator 29, including the central one 27, described hereinafter) to said frame 21, for example by gluing, screwing, riveting, clipping, welding or brazing, for example through a portion of said peripheral actuator 7.

According to another example, the manufacturing method further comprise a second step of cutting said raw plate 12 to form said frame 21, or at least one portion of the frame 21, said second cutting step then being advantageously, at least partially, concomitant with said common cutting step, so that said frame 21 is advantageously integral with said legs 5 (and said deformable plate 2), and formed substantially at the same time as these from said raw plate 12. Alternatively, the manufacturing method comprises a step of providing said ready-to-mount frame 21.

For each considered one of said legs 5, said fixed portion 23 could for example comprise a surface portion fastened to said frame 2 of said leg 5. According to another example, said fixed portion 23 could be substantially punctual, that is to say attached in a very localized manner to said frame 21 and in particular via one or several fastening point(s) for example each formed by a screw or a rivet, in particular during said fastening step.

Advantageously, during said equipment step, each leg 5 is preferably connected to only one respective peripheral actuator 7. More specifically, during said equipment step, each movable portion 22 is preferably connected to only one respective peripheral actuator 7. Thus, one single peripheral actuator 7 per leg 5 is advantageously sufficient to displace the latter, and generate for example a sufficient torsion at the periphery of the deformable plate 2 to use the adaptive optical device 1 in an adaptive optical system. Preferably, the design of the adaptive optical device 1 according to the invention allows needing only one single peripheral actuator 7 per actuator 5, whereas the combination of said movable portion 22 and of said fixed portion 23 allows each leg 5 to exert at least one deformation mode of said deformable plate 2 (and therefore of the wavefront) with a wide variety of amplitude, rationalizing not only the number of actuators and/or their power and/or their sizing in comparison with the configurations of the prior art, but also the number of legs, which makes the adaptive optical device 1 of the invention easy to set and to use, the manufacturing method thereby being easy to carry out. The implementation of the adaptive optical device 1 is particularly simple since said fixed portions 23 represent «passive» portions (in any case in translation, since in some cases, a rotation is still possible) of said legs 5 that need only to be fastened to said frame 21, the movable portions 22 representing the only «active» portions of said legs 5. Of course, said fixed portions 23 are not preferably connected directly to an actuator 7, since advantageously they are not movable in translation relative to said frame 21. Thus, this tricky configuration allows limiting the manufacturing cost and the complexity of the adaptive optical device 1 of the invention in comparison with the configurations of the prior art. Alternatively, each leg 5 is connected to several peripheral actuators 7, whose settings and operation are simple to implement with a satisfactory accuracy, thanks to the holding ensured by said fixed portions 23. According to this last alternative, during said equipment step, each leg 5 is connected to several respective peripheral actuators 7, for example to two peripheral actuators 7, as illustrated in FIG. 14, said two peripheral actuators 7 being positioned at a distance from each other and each connected to a different movable portion 22 of said leg 5. This last alternative has several ones of the same advantages as before, namely a wide variety of possible deformation amplitude of said deformable plate 2, as well as peripheral actuators 7 whose power has been minutely sized, while having a large number of possible deformation profiles. It is also possible that some of said legs 5 are connected to one single peripheral actuator 7 as mentioned before, whereas other ones of said legs are connected to several peripheral actuators 7, as mentioned before. Of course, the manufacturing method advantageously comprises a step of providing or manufacturing said peripheral actuators 7.

According to one embodiment, all of said fixed portions 23 are immovable relative to one another, in particular in the case of an embedded frame 21/fixed portion 23 connection.

According to a particular example, the respective peripheral actuators 7 of the two different corresponding legs 5 are designed so as to be actuated according to one another, in a conjugate manner, in order to deform said deformable plate 2 in a controlled manner, for example by exerting a torque to said deformable plate 2, preferably through its peripheral edge 11. Moreover, said torque does not need to be particularly high, said fixed portions 23 allowing controlling said deformation, advantageously accurately and without any considerable force, in particular thanks to the lever effect induced by said fixed portions 23.

Preferably, said legs 5 are soft, in order to be able to locally deform at the level of said movable portion 22 when the respective peripheral actuator 7 to which the leg 5 is connected displaces and/or deforms its movable portion 22, for example by pushing it or pulling it. Thus, said leg 5 is advantageously flexible enough to elastically fold when it is subjected to a tensile or compressive force by said respective peripheral actuator 7, but rigid or resilient enough to recover its original shape and position when the peripheral actuator 7 no longer exerts any force, this feature of said leg 5 being reinforced by the presence of said fixed portion 23 (which exerts a force for «biasing» or «holding» said leg 5). Such a configuration is particularly advantageous to easily and accurately calibrate the adaptive optical device 1, while guaranteeing an excellent operating time to the latter.

Advantageously, the adaptive optical device 1 of the invention allows implementing a deformable plate 2 which is deformable and thin or very thin, the forces expected from the peripheral actuators 7 to deform said deformable plate 2 in an effective and controlled manner being significantly reduced in comparison with an adaptive optical device of the prior art. Thus, advantageously, such a configuration allows using peripheral actuators of limited power (and therefore cost), which, in combination with the rationalized number of peripheral actuators 7 (since the fixed portions 23 are attached to said frame 21 rather than actuators) and a thin deformable plate 2, allows for significant miniaturization and lightening of the adaptive optical device 1, for a result that at least as effective as the adaptive optical device of the prior art implementing more complex designs with more actuators and/or more powerful actuators.

Advantageously, as illustrated in the figures, each leg 5 extends between a respective proximal end 24 attached to said plate 2 and a respective distal end 25 opposite to said proximal end 24. Preferably, the distal end 25 is the portion or the end of the considered leg 5 the farthest from the deformable plate 2, whereas the proximal end 24 is preferably the portion or the end of the considered leg 5 the closest to the deformable plate 2.

According to an alternative, said fixed portion 23 is located closer to said distal end 25 than to said proximal end 24. According to a particular embodiment of this alternative, illustrated in particular in FIGS. 1, 2, 9 and 10, said fixed portion 23 comprises said distal end 25, which is therefore fixedly attached to said frame 21. For example, as illustrated in FIG. 1, said fixed portion 23 comprises only said distal end 25 of said corresponding leg 5, said distal end 25 being attached to said frame 21 (or more specifically to said ring 8, as illustrated in FIG. 1), preferably by riveting, screwing, gluing, welding, brazing, etc. only via said distal end 25. According to another example, illustrated in particular in FIGS. 2, 9 and 10, said rigid ring 8 has an inner shoulder 26 on which said legs 2 are fastened, whereas said fixed portion 23 advantageously comprises, in addition to said distal end 25, a portion of the surface of said corresponding leg 5, said surface portion being for example attached (for example riveted, screwed, glued, brazed or welded) to said ring 8 at the level of said shoulder 26, and more generally to said frame 21. For example, said inner shoulder 26 may be formed by a bore formed across the thickness of said ring 8, and allows easily positioning the deformable plate 2 provided with said legs 5, these abutting against said inner shoulder 26 via their respective fixed portions 23. According to one alternative, said fixed portion 23 may be positioned between said distal 25 and proximal 24 ends, said distal end 25 may possibly be free, that is to say not connected to said frame 21. According to a particular embodiment, not illustrated herein, the fixed portion 23 is located closer to said proximal end 24 than to said distal end 25. According to still another particular embodiment, not illustrated herein, the fixed portion 23 is located equidistant between said proximal 24 and distal 25 ends.

Preferably, said movable portion 22 is positioned between said distal 25 and proximal 24 ends, as illustrated in the figures. Said movable portion 22 is preferably formed by the portion of the corresponding leg 5 at the level of which the corresponding peripheral actuator 7 is associated, for example via a glue point as described before. Alternatively, said movable portion 22 could be positioned at least partially at the level of said distal end 25 and/or at the level of said proximal end 24.

According to a particular embodiment, said movable portion 22 is positioned closer to said proximal end 24 than to said distal end 25, as illustrated in FIGS. 8 to 10 and 13. In other words, according to this example, said movable portion 22, as well as said peripheral actuator 7, are positioned closer to the deformable plate 2 than to said distal end 25. This configuration is for example advantageous in the case where the fixed portion 23 includes said distal end 25, since this allows in particular setting said fixed 23 and movable 22 portions at a distance from each other while approaching said movable portion 22 to the deformable plate 2, thereby imparting relatively low stresses to said legs 5 when the corresponding peripheral actuator 7 is operating, while allowing for a considerable deformation of said deformable plate 2, and that being so without said peripheral actuator 7 having to exert a considerable force.

Alternatively, said movable portion 22 is positioned equidistant between said proximal 24 and distal 25 ends; the advantage of this last configuration of course lies in its simple construction, but could result from other parameters (shape of the legs 5, desired deformation of the deformable plate 2, etc.).

According to still another alternative, said movable portion 22 is positioned closer to said distal end 25 than to said proximal end 24. This last configuration may be advantageous in some cases, for example when said legs 5 have a particular shape (for example trapezoidal as described hereinafter), in particular easier to deform towards said distal end 25 than to said proximal end 24, like in FIG. 12 and/or when the adaptive optical device 1 is relatively bulky and/or the legs 5 are very short, like in FIG. 1, or according to the desired deformation of the deformable plate 2.

Thus, the shape of said legs 5 may have some important role in the deformation of said deformable plate 2. For example, each leg 5 is substantially flat and has a generally rectangular shape, like in most figures, or trapezoidal, like in FIG. 12, the large base of the trapeze forming for example the proximal end 24, at the level of the peripheral edge 11, and the small base of the trapeze forming for example the distal end 25, away from the deformable plate 2. FIGS. 7 to 10 illustrate in particular substantially rectangular legs 5, the peripheral edge 11 of the deformable plate 2 forming a circle, whereas FIG. 12 illustrates trapezoidal legs 5 with a small base much smaller than the large base, the peripheral edge 11 of the deformable plate 2 forming a hexagon, and FIG. 13, in turn, illustrates slightly trapezoidal legs 5 with a small base with a size relatively close to that of the large base, the peripheral edge 11 of the deformable plate 2 being, herein again, a circle.

Said fixed 23 and movable 22 portions, belonging to the same leg amongst said legs 5, are preferably distinct from each other, and located at a distance from each other, along said leg 5.

Advantageously, and as represented in the figures, at least one of said legs 5 (or several ones, or all of them) extend(s) substantially, at rest, according to a second mean plane of extension P' (respective—in the case where this concerns several ones, or all said legs 5). Thus, at rest, that is to say preferably in the absence of any deformation mechanical load exerted on said deformable plate 5, for example by an actuator, said plate advantageously has an extent inscribed within said second mean plane of extension P' (or in the immediate vicinity of the latter, or on either side of the latter), preferably intersecting said deformable plate 5 across most or almost all of its thickness. According to a first example illustrated in most figures, at least one of said legs 5 (or several ones, or all of them) has/have, at rest, a substantially planar surface. According to a second example, illustrated in FIG. 6, which does not restrict the example, at least one of said legs 5 (or several ones, or all of them) has/have, at rest, a curvature that is preferably continuous. Alternatively, at least one of said legs 5 (or several ones, or all of them) has/have, at rest, a primary portion having a substantially planar surface and a secondary portion having a preferably continuous curvature.

According to a particular embodiment, and as illustrated in FIGS. 1, 2, and 7 to 14, at least one or several ones of said legs 5 (or all of them) extend, at rest, substantially in the continuation of said deformable plate 2, preferably in the continuation of said first mean plane of extension P. Thus, said first mean plane of extension P is advantageously parallel to, or coincident with, said (respective) second mean plane of extension P'. Thus, at rest, that is to say preferably in the absence of any deformation mechanical load exerted on said deformable plate 2, the latter and one, several ones or all of the legs 5 in its continuation advantageously extend according to the same continuous and regular, advantageously straight, profile which could alternatively be stairs-like shaped, said considered leg 5 and said deformable plate 2 then forming respectively first and second parallel steps of stairs, said two steps being at different altitudes, said first P and second P' mean planes then being parallel and non-coincident. For example, at least one of said legs 5 (or several ones, or all of them) projects outwardly from said deformable plate 2 from the peripheral edge 11 of the latter. Thus, said legs 5 are preferably disposed laterally with respect to said deformable plate 2, in the continuity of the latter.

According to another particular embodiment, and as illustrated in FIGS. 3 to 6, said (respective) second mean plane of extension P' is secant with said first mean plane of extension P. Thus, at rest, that is to say preferably in the absence of any deformation mechanical load exerted on said deformable plate 2, the latter and said legs 5 in its continuation advantageously extend according to the same continuous profile having at least one angle, said angle separating said deformable plate 2 from the considered leg 5. Hence, according to this example, said first P and second P' mean planes of extension are not coincident. Thus, according to this example, at least one of said legs 5 extends, at rest, substantially obliquely or perpendicularly with respect to said deformable plate 2.

Figure 5:
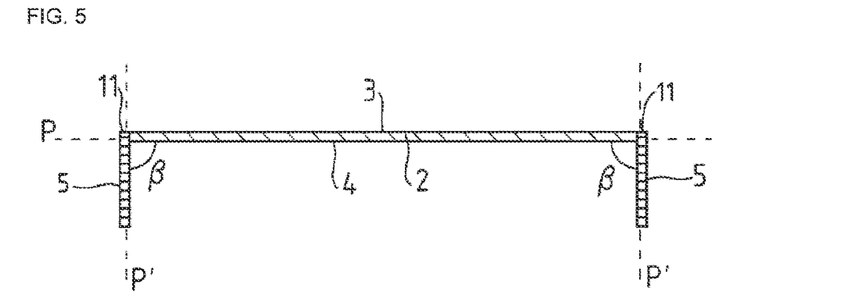
FIG. 5 illustrates a section according to a sagittal plane of still another embodiment of the adaptive optical device, with a right dihedral angle between the deformable plate and the legs, with no frame and no actuator.
Figure 6:
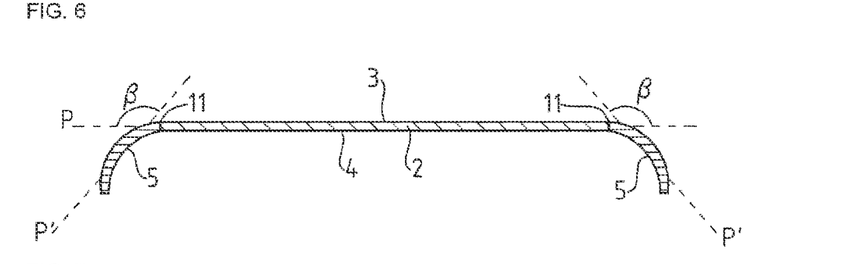
FIG. 6 illustrates a section according to a sagittal plane of still another embodiment of the adaptive optical device, with round-shaped legs, with no frame and no actuator, with an obtuse dihedral angle between the deformable plate and the legs.
Figure 7:
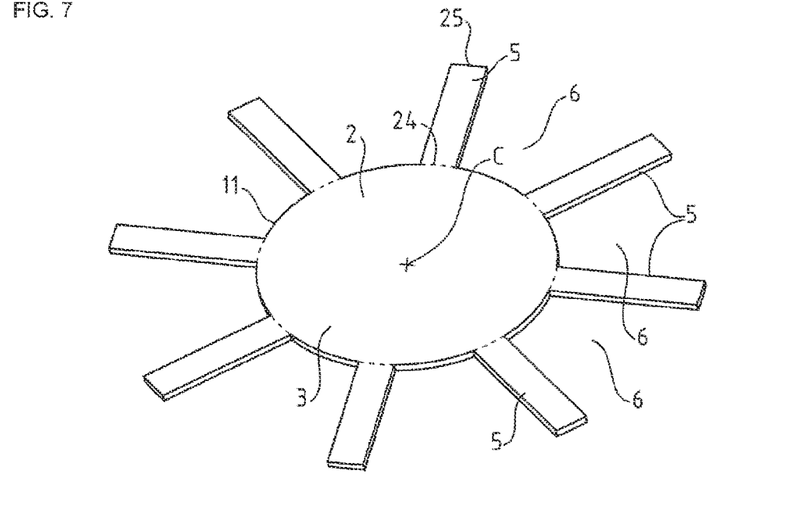
FIG. 7 illustrates, according to a perspective view, the plate provided with legs of the adaptive optical device of FIG. 9, the deformable plate being viewed on the incident face side thereof.
Figure 8:
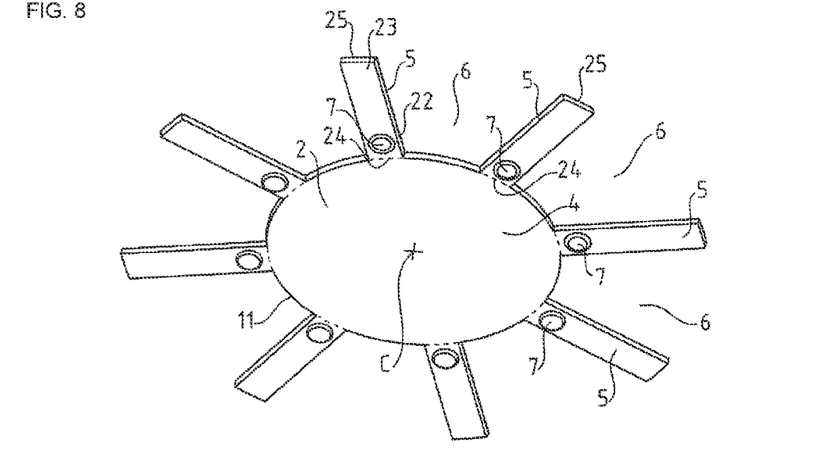
FIG. 8 illustrates, according to a perspective view, the plate and the legs of FIG. 9, each of the legs being herein equipped with a respective peripheral actuator, the deformable plate being viewed on the hidden face side thereof.

More advantageously, said second mean plane of extension P' forms a dihedral angle β with said first mean plane of extension P. For example, as illustrated in FIG. 5, said first P and second P' mean planes of extension are orthogonal. In other words, according to this example, said first mean plane of extension P transversely intersects said second mean plane of extension P', said dihedral angle β being advantageously perpendicular, that is to say substantially equal to 90°. According to another example, as illustrated in FIGS. 3, 4 and 6, said first P and second P' mean planes of extension are oblique with respect to each other. Said dihedral angle β may be acute or obtuse, that is to say respectively comprised between 0° and 90° excluded or between 90° and 180° excluded. More preferably, said dihedral angle β is comprised between 30° and 60° or between 120° and 150°. In the example illustrated in FIG. 6, where said legs 5 have a curvature, the second mean plane of extension P' is preferably oblique with respect to said first mean plane P and secant with the latter, and the dihedral angle β between these two planes is advantageously obtuse. Advantageously, it is possible to carry out any useful combination of different legs 5 each extending according to a respective second mean plane of extension P', coincident, parallel or secant with said first mean plane of extension P, said respective second mean planes P' themselves being coincident, parallel or secant with one another. Preferably, said secondary making step comprises a step of folding at least one of said legs 5, so that the latter extends substantially obliquely or perpendicularly with respect to said deformable plate 2. For example, said leg 5 extends according to a second mean plane of extension P' and said deformable plate 2 extends, at rest, substantially according to a first mean plane of extension P, said folding step being implemented so that said first P and second P' mean planes of extension are secant. More preferably, said fold is not reversible, that is to say advantageously formed in order to fold said plate 5 in a non-elastic manner. FIGS. 4 to 6 illustrate examples of legs 5 attached to the deformable plate 2 resulting from this last step, where the respective legs 5 have been folded according to a dihedral angle β formed between the first P and second P' mean planes of extension, said dihedral angle β of FIGS. 3, 4, 5, and 6 being respectively obtuse, acute, perpendicular and obtuse.

Preferably, and as illustrated in the figures, said deformable plate 2 and said legs 5 respectively have first and second thicknesses, said first and second thicknesses being, for example, substantially identical. Such a configuration is sometimes advantageous to standardize the manufacture of said deformable plate 2 and/or of said legs 5. This is particularly advantageous, since it is possible, thanks to the adaptive optical device 1 of the invention, to reduce the risks of error during making of the adaptive optical device 1 while using a thin or very thin (and therefore easier to deform but relatively fragile) deformable plate 2 which could be made in one-piece. Nonetheless, the invention is not limited to this preferred embodiment, and it is for example possible to consider that said thicknesses differ, for example with said second thickness larger than said first thickness, or vice versa.

Advantageously, the adaptive optical device 1 also comprises at least one additional actuator 29 designed so as to apply a force directly on said deformable plate 2 to deform it, rather than on one of said legs 5. Thus, this additional actuator 29 advantageously allows locally completing or refining the overall action of the peripheral actuators 7. In particular, said additional actuator 29 is designed so as to apply punctual or almost-punctual forces to said deformable plate 2, or alternatively to apply forces distributed over a surface of said deformable plate 2. For example, said additional actuator 29 is formed by at least one piezoelectric film provided over a surface of the deformable plate 2 (and in particular over the hidden face 4) and which is intended to produce a bimetal effect curving the deformable plate 2 at least locally when an electric current is applied to said piezoelectric film.

The adaptive optical device 1 may further comprise at least one central actuator 27, as illustrated in FIGS. 10 and 12, designed so as to apply a force (preferably almost-punctual) at said geometric center C, said central actuator 27 therefore forming said or one of said additional actuators 29. Said additional actuator(s) 29 may also be connected to the plate 2 elsewhere than at the geometric center C, as illustrated by the example of FIG. 13 where the adaptive optical device 1 comprises in particular four additional actuators 29 disposed around and at a distance from the geometric center C of the deformable plate 2, on said hidden face 4 side, as well as the example of FIG. 14, where the adaptive optical device 1 comprises in particular two additional actuators 29 disposed on either side and at a distance from the geometric center C of the deformable plate 2, on said hidden face 4 side.

Advantageously, said additional 29 (for example central 27) actuator is designed so as to exert a pressure or a tension (for example central) on said deformable plate 2 on the side and through said hidden face 4. Advantageously, said pressure or tension (for example central) deforms said deformable plate 2 to introduce or correct an aberration, for example an ellipsoidal aberration, in the incident wavefront when the latter is reflected by said incident face 3 and/or refracted via said deformable plate 2. Preferably, said aberration varies at least locally at the level of the deformable plate 2 (for example at the level of the geometric center C) according to the force exerted by said additional 29 (for example central 27) actuator on said hidden face 4. Of course, said adaptive optical device 1 may comprise several additional 29 (whether central or not) actuators in combination, in particular as described hereinbefore and/or hereinafter, of the same kind or of different kinds. Advantageously, said additional 29 (for example central 27) actuator may be of any type (piezoelectric, magnetic, in two portions, mechanical, with screw, etc.), including those that are known in the considered technical field. For example, said additional 29 (for example central 27) actuator is connected to said hidden face 4 via a glue point (for example at the level of said geometric center C), and transmits a tensile or compressive force locally at the surface of said hidden face 4 to deform said deformable plate 2. Still more advantageously, said force is therefore exerted according to a direction locally substantially perpendicular to said incident face 3.

Each peripheral 7 and/or additional 29 (for example central 27) actuator preferably has a first portion secured (that is to say fixedly attached) to said corresponding leg 5 and a second portion secured to said frame 21, said first and second portions themselves may be connected to one another in translation, for example in the case of a piezoelectric-type peripheral 7 and/or additional 29 actuator (preferably with an almost-punctual force in this case), or not secured to one another for example in the case of a magnetic-type peripheral 7 and/or additional 29 actuator. For example, during said equipment step in particular, said first portion is glued to said corresponding leg 5 through a glue drop, and advantageously has a head, for example with a substantially cylindrical, conical or frustoconical shape, immersed in said drop without coming into contact with said corresponding leg 5, said glue drop thereby forming a ball-joint connection between said head and said corresponding leg 5. In particular, this allows avoiding the considered peripheral 7 and/or additional 29 (for example central 27) actuator causing a deformation of the surface of the deformable plate 2 even in the absence of any deformation mechanical load of said actuator, by the mere effect of its connection with said deformable plate 2 (for example in the case where the considered actuator is a central actuator 27) or with a leg 5 (for example in the case where the considered actuator is a peripheral actuator 7).

FIG. 10 shows an example of manufacture of said deformable plate 2 and of said legs 5 attached to the latter, said legs 5 even being, in this instance, integral with said deformable plate 2 and formed during said common step of cutting said raw plate 12. Afterwards, each of the peripheral actuators 7 is connected to one of said respective legs 5, on the hidden face 4 side, so that each leg 5 is provided with at least one peripheral actuator 7, and thereby defining a movable portion 22 of the considered leg 5 connected to said peripheral actuator 7. An additional actuator 29, for example a central actuator 27, is also placed at the level of the geometric center C of the deformable plate 2, also on the hidden face 4 side. Finally, the deformable plate 2 and the legs 5 that are attached thereto are placed at the center of the ring 8, the distal ends 25 of the legs 5 fitting in the shoulder 26 of the ring 8, the shoulder 26 abutting against the legs 5 which are then connected, by riveting, screwing, brazing, gluing or welding, to the ring 8, thereby defining the fixed portions 23 since the ring 8 herein forms at least one portion of the frame 21. Optionally, the adaptive optical device 1 also includes a cap 28 having an aperture, for example at its center, the cap being designed so as to delimit the incident face 3 of the deformable plate 2, and more specifically the optical surface of the incident face 3, that is to say the optically-active portion of the incident face 3. In the examples of FIGS. 9, 10 and 15, the cap 28 is placed on the deformable plate 2 on the incident face 3 side, so as to fit in said shoulder 26. FIG. 11 partially shows an alternative manufacture, wherein only the secondary making step is represented, where said portions 5 are formed separately from said deformable plate 2 and then attached to the latter.

An example of use of the previously-described adaptive optical device 1 will now be disclosed. According to this example, it is desired to correct an optical aberration noticed in the wavefront using the adaptive optical device, which could be a deformable mirror or an adaptive lens. Hence, the adaptive optical device 1 will be positioned on the pathway of the wavefront, so that the incident face 3 of the deformable plate 2 intercepts said wavefront to deform it, and in particular to reflect it and/or refract it. In general, this interference alone is not enough to correct the noticed optical aberration: it is necessary to modify the deformation (reflection and/or refraction) caused by the incident face 3 and/or the deformable plate 2 to modify the wavefront in a satisfactory manner. For this purpose, the deformable plate 2 to which the incident face 3 belongs should be deformed so that the latter curves (or flattens) in a determined, accurate and often localized manner, in particular so as to have a determined and constant angle of curvature. Thus, at least one peripheral actuator 7 will be activated so it displaces (and optionally, deforms) the movable portion 22 of one of said legs 5 to which it is connected in a controlled manner by pushing it or pulling it, that is to say be displacing it towards the incident face 3 or towards the opposite hidden face 4 of the adaptive optical device 1. The displaced movable portion 22 causes a slight deformation of the deformable plate 2 with which it is secured, through the peripheral edge 11 connecting the deformable plate 2 and the leg 5. The deformation of the deformable plate 2 is limited and perfectly controlled thanks to the presence of the fixed portion 23 of the leg 5, the fixed portion 23 being fixedly connected to the frame 21 and therefore remaining immovable relative to the latter, at least in translation, during and after the displacement of the movable portion 22. It is possible to activate several peripheral actuators 7, and possibly at least one additional actuator 29 which is for example a central actuator 27, successively or concomitantly, in order to deform the deformable plate 2 in a satisfactory manner, so that its incident face 3 receives the incident wavefront according to determined deformable plate 2 angle and deformation, so as to correct the optical aberration. Thus, FIG. 15 shows a configuration wherein one or several movable portion(s) 22 has/have been displaced by its/their respective peripheral actuators 7 (hidden by the cap 28 in the figure), the respective fixed portion 23 not having been displaced at all as they are connected to said frame 21.

Afterwards, the adaptive optical device 1 could be set in an inoperative position, the displaced legs 5 being set back in their start position in the continuation of the deformable plate 2, in particular thanks to their elastic behavior, the deactivation of the peripheral actuators 7, and the biasing or holding force exerted by the fixed portions 23 of the legs 5 on the rest of the leg 5 and therefore on the deformable plate 2.

Another example of use of an adaptive optical device 1 according to the invention will be described hereinafter, without this example constituting any limitation with regards to the possible uses of the adaptive optical device 1 of the invention. According to this example, the adaptive optical device 1 modifies the shape of the incident wavefront. The incident wavefront is deformed, for example reflected and/or refracted, by the deformable plate 2, thereby resulting in a deformed, for example reflected and/or refracted, wavefront. The incident wavefront has a phase which is thus locally in advance or delayed, with respect to the reflected and/or refracted wavefront, depending on the geometric shape of the deformable plate 2 and in particular of the incident face 3. Depending on their selected actuation combinations and their arrangement within the adaptive optical device 1, the peripheral actuators 7 (possibly in combination with said additional actuator(s) 29) enable the latter to generate different Zernike polynomials (not present in particular in the incident wavefront) within the deformed wavefront. Thus, by actuating one or several peripheral 7 (and possibly additional 29) actuator(s), it is possible to generate different Zernike polynomials so that the deformable plate 2 introduces in the incident wavefront one or several optical aberrations such as astigmatism, «defocus», «trefoil» and/or coma. The different activations, mentioned before or not, of the peripheral actuators 7 (and optionally of one or several additional actuator(s) 29, in particular a central actuator 27) could be combined together to generate or correct more complex optical aberrations.

Any combination of the different examples and variants mentioned hereinbefore is of course possible, with regards to what seems to be relevant in the considered technical field to make an appropriate adaptive optical device.

Optionally, said step of forming said deformable plate 2 may comprise a step of securing, in particular by gluing, brazing and/or welding, a central plate on said raw plate 12, said central plate advantageously comprising said incident face 3. Preferably, the raw plate 12 is made of a material that is less expensive than that in which the central plate is made because said raw plate 12 allows forming said legs 5, for example by cutting, at an advantageous cost price. Indeed, said deformable plate 2 shall preferably have an excellent surface quality and therefore the material constituting it is generally quite expensive, while said legs 5 only need to have appropriate mechanical properties (elasticity in particular), rather than a particular surface condition.

Preferably, said common cutting step and/or said second cutting step comprises a selective etching operation.

According to a particular embodiment, the manufacturing method further comprise a step of reflective treatment of said incident face 3 to form a reflective face, said adaptive optical device 1 being a deformable mirror. Preferably, said reflective treatment step comprises a step of covering said incident face 3 with a reflective coating. For example, this coverage step may comprise a scattering of a reflective element over said incident face 3, so as to form, at the level of the incident face 3, a reflective face capable of reflecting said wavefront. According to one embodiment, said reflective treatment step is applied to said central plate, on said incident face 3 side, to form said reflective face.

The adaptive optical device 1 of the invention, preferably obtained through the manufacturing method of the invention, allows carrying out extremely fine operations of deforming an incident wavefront in an adaptive optical system, by reflection and/or refraction of the wavefront, and that being so for controlled servicing and making costs through a simple, accurate and quick setting.

INDUSTRIAL APPLICABILITY

The invention finds its industrial application in the design, manufacture and use of adaptive optical devices.

The invention claimed is:

1. An adaptive optical device (1) including a deformable plate (2) intended to deform an incident wavefront by refraction and/or reflection, characterized in that it further comprises at least:
   legs (5) fixedly attached to said deformable plate (2),
   a frame (21) fixed with respect to said deformable plate (2),
   a plurality of peripheral actuators (7),
   each leg (5) comprising a movable portion (22) connected to at least one respective of the peripheral actuators (7) so the latter could locally deform said leg (5) so that the latter transmits a deformation force to said deformable plate (2), each leg (5) further comprising a respective fixed portion (23) which is fixedly attached to said frame (21) so as to be immobilized with respect to the latter.

2. The adaptive optical device according to the claim 1, characterized in that said fixed portion (23) is immobilized at least in translation according to at least one fastening direction (F) with respect to said frame (21).

3. The adaptive optical device according to claim 1, characterized in that said fixed portion (23) is:
   in embedded connection with said frame (21), without any degree of freedom relative to the latter, or
   in pivot connection with said frame (21), or
   in ball-joint connection with said frame (21).

4. The adaptive optical device according to claim 1, characterized in that said fixed portion (23) comprises said distal end (25), which is therefore fixedly attached to said frame (21).

5. The adaptive optical device according to claim 1, characterized in that each leg (5) extends between a respective proximal end (24) attached to said deformable plate (2) and a respective distal end (25) opposite to said proximal end (24), and in that said movable portion (22) is positioned between said distal (25) and proximal (24) ends.

6. The adaptive optical device according to claim 1, characterized in that each leg (5) extends between a respective proximal end (24) attached to said deformable plate (2) and a respective distal end (25) opposite to said proximal end (24), and in that said fixed portion (23) is located closer to said distal end (25) than to said proximal end (24).

7. The adaptive optical device according to claim 1, characterized in that each leg (5) is substantially flat and has a generally rectangular or trapezoidal shape.

8. The adaptive optical device according to claim 1, characterized in that said deformable plate (2) and said legs (5) attached to the latter form together a deformable body in one-piece star-like shaped with several branches, each branch being formed by one of said legs (2).

9. The adaptive optical device according to claim 1, characterized in that said frame (21) comprises a rigid ring (8) at the middle of which said deformable plate (2) provided with said legs (5) is positioned, said rigid ring (8) optionally having an inner shoulder (26) on which said legs (2) are fastened.

10. The adaptive optical device (1) according to claim 1, characterized in that one of more of said legs (5) extend(s), at rest, substantially in the continuation of said deformable plate (2).

11. The adaptive optical device (1) according to claim 1, characterized in that it also comprises at least one additional actuator (29) designed so as to apply a force directly on said deformable plate (2) to deform it.

12. The adaptive optical device (1) according to claim 1, characterized in that said deformable plate (2) has a geometric center (C), and in that each leg (5) extends, from said deformable plate (2), radially with respect to said geometric center (C).

13. The adaptive optical device (1) according to claim 1, characterized in that said deformable plate (2) has a geometric center (C), and in that said legs (5) are angularly distributed evenly around said geometric center (C).

14. The adaptive optical device (1) according to claim 1, characterized in that said legs (5) are integral with said deformable plate (2).

15. The adaptive optical device (1) according to claim 1, characterized in that it preferably comprises at least four legs (5).

16. The adaptive optical device (1) according to claim 1, characterized in that it constitutes a deformable mirror and/or an adaptive lens.

17. A method for manufacturing an adaptive optical device (1) including a primary step of making or providing a deformable plate (2) intended to deform an incident wavefront by refraction and/or reflection, the method being characterized in that it further comprises at least:
   a secondary step of making legs (5) fixedly attached to said deformable plate (2),
   an equipment step, during which a respective movable portion (22) of each leg (5) is connected to at least one respective actuator (7), so that the latter could locally deform said leg (5) so that the latter transmits a deformation force to said deformable plate (2),
   a fastening step, during which a respective fixed portion (23) of each leg (2) is fixedly attached to a frame (21) fixed with respect to said deformable plate (2) so as to be immobilized with respect to the latter.

18. The manufacturing method according to claim 17, characterized in that said primary and secondary making steps are at least partially concomitant, and in that they comprise a common step of cutting a raw plate (12) to form said legs (5) and said deformable plate (2), said legs (5) being integral with said deformable plate (2).

19. The manufacturing method according to claim 17, characterized in that said secondary making step comprises a step of securing said legs (5) to said deformable plate (2), for example by welding, gluing and/or brazing.

20. The manufacturing method according to claim 19, characterized in that during said securing step, at least one portion of said legs 5 is secured to said deformable plate 2:
- over an end of said deformable plate 2,
- over said deformable plate 2, and/or
- under said deformable plate 2.

* * * * *